United States Patent
Ivester et al.

(10) Patent No.: US 9,499,269 B2
(45) Date of Patent: Nov. 22, 2016

(54) OVERHEAD EQUIPMENT STOWAGE POD FOR AN AIRCRAFT INTERIOR

(71) Applicant: B/E AEROSPACE, INC., Wellington, FL (US)

(72) Inventors: Clarence Ivester, Arlington, WA (US); Robert Papke, Camano Island, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 152 days.

(21) Appl. No.: 14/245,874

(22) Filed: Apr. 4, 2014

(65) Prior Publication Data

US 2014/0299711 A1    Oct. 9, 2014

Related U.S. Application Data

(60) Provisional application No. 61/808,857, filed on Apr. 5, 2013.

(51) Int. Cl.
*B64D 11/00* (2006.01)
*B64D 13/00* (2006.01)
*B64C 1/06* (2006.01)

(52) U.S. Cl.
CPC ............. *B64D 11/00* (2013.01); *B64C 1/066* (2013.01); *Y10T 29/49817* (2015.01); *Y10T 29/49826* (2015.01)

(58) Field of Classification Search
CPC ..... B64C 1/006; B64C 11/00; B64C 11/003; Y10T 29/49817; Y10T 29/49826
See application file for complete search history.

(56) References Cited

U.S. PATENT DOCUMENTS

| | | | |
|---|---|---|---|
| 5,129,597 A * | 7/1992 | Manthey | B60Q 3/025 244/118.5 |
| 5,395,074 A | 3/1995 | Hart | |
| 5,921,645 A | 7/1999 | Lapi | |
| 5,954,410 A | 9/1999 | Noellert | |
| 6,899,299 B2 * | 5/2005 | Ritts | B64D 11/003 244/118.5 |
| 7,246,865 B1 | 7/2007 | Merrell, II | |
| 7,455,263 B2 * | 11/2008 | Lau | B60Q 3/025 244/118.5 |
| D608,721 S | 1/2010 | Wilcynski | |
| 8,636,249 B2 | 1/2014 | Conen | |
| 2002/0084732 A1 | 7/2002 | Steadman | |

(Continued)

FOREIGN PATENT DOCUMENTS

| | | |
|---|---|---|
| JP | 2001-151012 A | 6/2001 |
| JP | 2002-293193 A | 10/2002 |

(Continued)

OTHER PUBLICATIONS

International Search Report and Written Opinion issued in related application PCT/US2014/033076, Aug. 19, 2014, 8 pages.

(Continued)

*Primary Examiner* — Philip J Bonzell
(74) *Attorney, Agent, or Firm* — Drinker Biddle & Reath LLP

(57) ABSTRACT

An overhead equipment stowage pod comprises a base having a structural material surrounding a central opening. The central opening is open on top and bottom, and the base is fastened to a support structure proximate a ceiling. A replaceable stowage bin is at least partially inserted through the base into the ceiling, and a closeable door is suspended below the stowage bin.

19 Claims, 4 Drawing Sheets

(56) References Cited

U.S. PATENT DOCUMENTS

2006/0197419 A1  9/2006  Sorensen
2009/0284110 A1  11/2009  Mascari

FOREIGN PATENT DOCUMENTS

| JP | 2003-135175 A | 5/2003 |
| JP | 2007-203959 A | 8/2007 |
| JP | 2008-002241 A | 1/2008 |

OTHER PUBLICATIONS

Office Action issued in related application JP 2016-506669, Aug. 4, 2016, 9 pages (with translation).

\* cited by examiner

OVERHEAD EQUIPMENT STOWAGE POD FOR AN AIRCRAFT INTERIOR

CROSS-REFERENCE TO RELATED APPLICATION

This application claims the priority benefit of U.S. Provisional Patent Application No. 61/808,857, entitled "Overhead Equipment Stowage Pod for an Aircraft Interior" and filed on Apr. 5, 2013, in the United States Patent and Trademark Office, the disclosure of which is incorporated herein by reference in its entirety.

BACKGROUND

1. Field

Embodiments relate to enclosures for stowing equipment on an aircraft. More specifically, embodiments relate to an overhead equipment stowage pod for an aircraft interior.

2. Related Art

Conventional enclosures for stowing equipment on an aircraft are located along walls of the aircraft, for example, in closets, behind a last row of seats at the back of a passenger cabin, in galley areas, or in portions of overhead luggage bins. Each of these areas takes space that could otherwise be used for other purposes, such as additional seating or luggage storage space. In a commercial aircraft, these other purposes could be revenue-generating, whereas stowing equipment may not be. Efficient utilization of space is an important goal of aircraft interior designs. In commercial aircraft in particular, maximizing space available for revenue generating uses is an important consideration.

SUMMARY

According to an embodiment, an overhead equipment stowage pod comprises: a base having generally vertical walls and an open top fastened to a support structure proximate a ceiling; a replaceable stowage bin at least partially inserted through the base into the ceiling; a closeable door suspended below the stowage bin; and a replaceable equipment palette fastened to an interior side of the closeable door.

According to another embodiment, a method of installing an overhead equipment stowage pod comprises: installing a base having generally vertical walls and an open top in a ceiling by fastening the base to a support structure above a level of a ceiling panel; forming a replaceable stowage bin to compensate for obstacles between the generally vertical walls above the level of the ceiling panel; fastening the replaceable stowage bin to the base when at least partially inserted through the base into the ceiling; attaching a closeable door to the base; and fastening a replaceable equipment palette to an interior side of the closeable door to be accessible when the closeable door is opened.

According to another embodiment, an overhead equipment stowage pod apparatus comprises a base having a structural material surrounding a central opening. The central opening is open on top and bottom, and the base is fastened to a support structure proximate a ceiling. A replaceable stowage bin is at least partially inserted through the base into the ceiling, and a closeable door is suspended below the stowage bin.

The apparatus may further comprise a replaceable equipment palette fastened to an interior side of the closeable door.

The replaceable equipment palette may include at least one of emergency equipment and entertainment equipment.

The apparatus may further include a bezel that surrounds the base proximate the ceiling, and the bezel may include a lighting element that shines light.

The apparatus may further include a bezel that surrounds the base below a level of the ceiling, leaving a gap between the ceiling and the bezel. The bezel may include a lighting element that shines light onto the ceiling surrounding the bezel from within the gap between the ceiling and the bezel.

The apparatus may further include a ceiling panel that includes a cutout into which the base is inserted, and a recessed pod well surrounding the base.

The apparatus may further include a bezel that surrounds the base below a level of the recessed pod well, leaving a gap between the recessed pod well and the bezel. The bezel may include a lighting element that shines light onto the recessed pod well surrounding the bezel from within the gap between the recessed pod well and the bezel, and the recessed pod well may be contoured upward above the bezel and configured as a light wash to disperse the light shined by the lighting element.

The apparatus may further include a lift assist unit attached to the base and the closeable door that assists in raising and lowering the closeable door.

The replaceable stowage bin may include a molded feature formed to accommodate an obstacle in the ceiling.

The apparatus may further include a plurality of tie rods that attach the base to the support structure.

According to another embodiment, an overhead equipment stowage pod apparatus includes a base having generally vertical walls and an open top fastened to a support structure proximate a ceiling, a ceiling panel that includes a cutout into which the base is inserted, and a recessed pod well surrounding the base. The apparatus also includes a bezel that surrounds the base below a level of the recessed pod well, leaving a gap between the recessed pod well and the base. The bezel includes a lighting element that shines light onto the recessed pod well surrounding the bezel from within the gap between the recessed pod well and the base. The recessed pod well is contoured upward above the bezel and configured as a light wash to disperse the light shined by the lighting element. A replaceable stowage bin is at least partially inserted through a central opening in the base into the ceiling, a closeable door is suspended below the stowage bin, and a replaceable equipment palette fastened to an interior side of the closeable door.

The apparatus may further include a lift assist unit attached to the base and the closeable door that assists in raising and lowering the closeable door.

The replaceable stowage bin may include a molded feature formed to accommodate an obstacle in the ceiling.

The apparatus may further include a plurality of tie rods that attach the base to the support structure.

According to another embodiment, a method of installing an overhead equipment stowage pod includes installing a base having structural material surrounding a central opening in a ceiling by fastening the base to a support structure above a level of a ceiling panel. The central opening being open on top and bottom. The method also includes forming a replaceable stowage bin to compensate for obstacles above the central opening of the base and above the level of the ceiling panel, fastening the replaceable stowage bin to the base when at least partially inserted through the central opening of the base into the ceiling, and attaching a closeable door to the base.

The method may further include fastening a replaceable equipment palette to an interior side of the closeable door to be accessible when the closeable door is opened.

The method may further include surrounding the base with a bezel proximate the ceiling, and shining light from the bezel.

The light may shine onto the ceiling surrounding the bezel from within a gap between the ceiling and the bezel.

The light may shine onto a recessed pod well surrounding the bezel from within a gap between the recessed pod well and the bezel, and the recessed pod well may be contoured upward above the bezel and disperse the light.

The method may further include opening the closeable door to reveal the stowage bin in the central opening of the base, removing the replaceable stowage bin from within the central opening of the base, accessing equipment behind the ceiling panel through the central opening of the base, replacing the replaceable stowage bin within the central opening of the base, and closing the closeable door.

While the exemplary embodiments described herein are presented in the context of an aircraft cabin, these embodiments are exemplary only and are not to be considered limiting. The embodiments of the apparatus are not limited to use in an aircraft cabin. The embodiments may be used in various other vehicles including, but not limited to, spacecraft, ships, buses, trains, recreational vehicles, trucks, automobiles, and the like. Embodiments of the apparatus may also be used in homes, offices, hotels, factories, warehouses, garages, and other locations where it may be desirable to have equipment stowage in an overhead pod.

BRIEF DESCRIPTION OF THE DRAWINGS

Exemplary embodiments will be explained in more detail with reference to the attached drawings in which the embodiments are illustrated as briefly described below.

DETAILED DESCRIPTION

Figure 1:
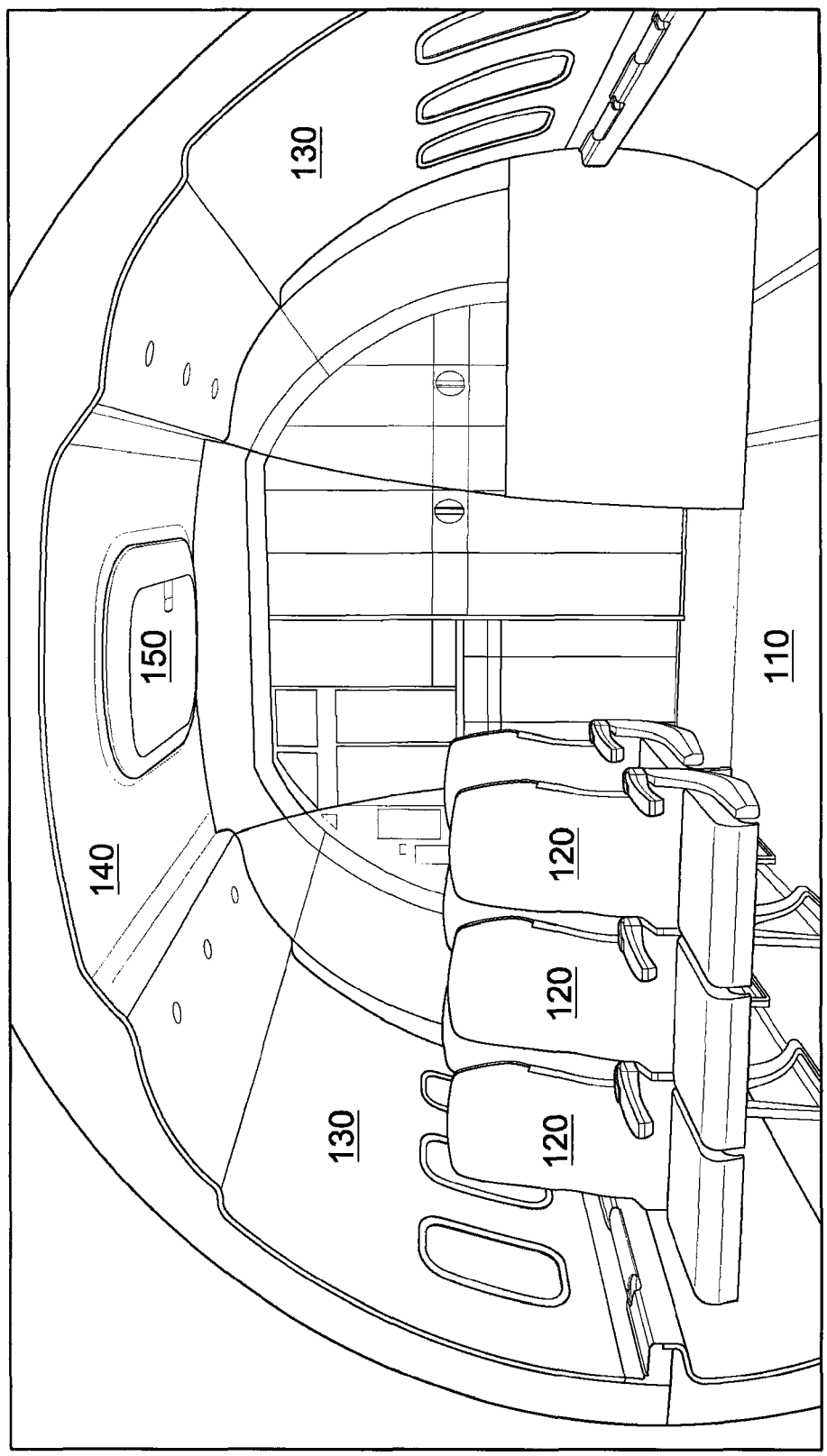
FIG. 1 is a perspective view that illustrates an aircraft cabin including an overhead equipment stowage pod, according to an embodiment.

FIG. 1 is a perspective view that illustrates an aircraft cabin including an overhead equipment stowage pod 150, according to an embodiment. The overhead equipment stowage pod 150 may include a container, bin, or bucket recessed into a ceiling 140 of the aircraft cabin, for example above an aisle 110 in a central region of the aircraft cabin away from sidewalls 130 and adjacent rows of seats 120. The overhead equipment stowage pod 150 may have a contoured exterior that complements the interior of the aircraft cabin so that the overhead equipment stowage pod 150 may blend in with the decor and ambiance of the aircraft cabin.

The overhead equipment stowage pod 150 may have a portion protruding downward from the ceiling 140 sufficiently far that a person may be able to reach a handle of the overhead equipment stowage pod 150 to access its contents without standing on a stepstool or ladder. For example, in an embodiment, a person who stands five feet three inches tall may be able to reach upward to grasp a handle of the overhead equipment stowage pod 150, pull downward, and open the overhead equipment stowage pod 150 to access equipment stored inside.

While the overhead equipment stowage pod 150 is shown in FIG. 1 as being toward a back of an aircraft cabin, this should not be construed as limiting. The overhead equipment stowage pod 150 may be installed in the ceiling in various other locations of the aircraft, for example toward a front of the aircraft cabin, along one or more aisles of the aircraft cabin, in a ceiling of a galley of the aircraft, and generally in any location in which stowage of equipment in the ceiling of the aircraft would be beneficial.

Figure 2:
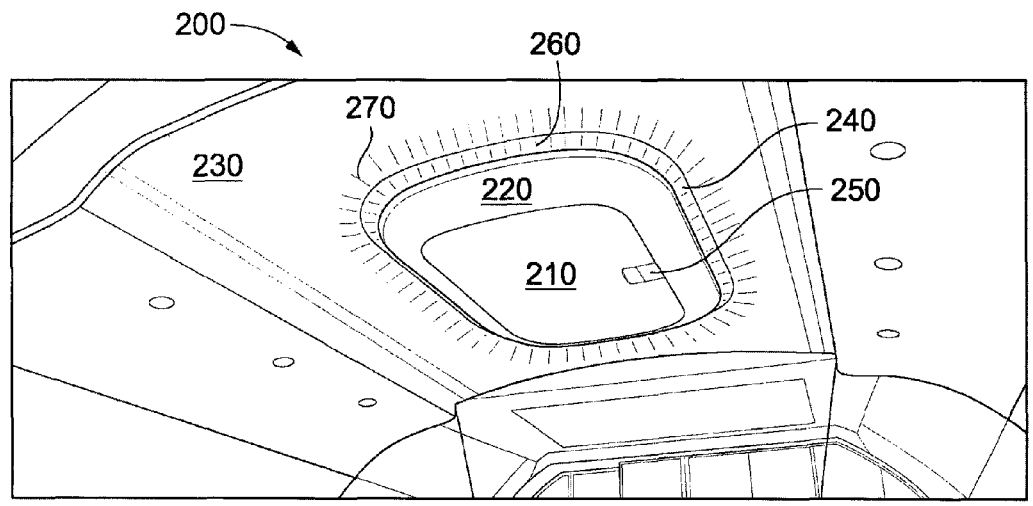
FIG. 2 is a close-up perspective view that illustrates an overhead equipment stowage pod in a closed position, according to an embodiment.

FIG. 2 is a close-up perspective view that illustrates an overhead equipment stowage pod 200 in a closed position, according to an embodiment. The overhead equipment stowage pod 200 may be an embodiment of the overhead equipment stowage pod 150 of FIG. 1. The overhead equipment stowage pod 200 includes a door 210 that may be opened by operating a door handle 250. The overhead equipment stowage pod 200 also includes a bezel 220 surrounding the door 210. The bezel 220 may be installed using one or more fasteners, and may be interchangeable or individually replaceable. In various embodiments, the bezel 220 may be a decorative bezel that complements the decor of the aircraft cabin. The overhead equipment stowage pod 200 may be installed in the ceiling of the aircraft cabin in conjunction with a ceiling panel 230 that includes a cutout into which the overhead equipment stowage pod 200 is inserted, and a recessed pod well 240 surrounding the overhead equipment stowage pod 200. The ceiling panel 230 may be modular and replace a conventional ceiling panel that does not include an overhead equipment stowage pod in an existing aircraft. The ceiling panel 230 may be customized in shape, color, materials, and size to replace an appropriate section of existing ceiling panel in an existing aircraft, thereby facilitating installation of the overhead equipment stowage pod 200 in an existing aircraft as a retrofit.

As illustrated, the bezel 220 does not reach all the way to the ceiling panel 230, but rather leaves a gap between the bezel 220 and the recessed pod well 240. The bezel 220 may include lighting that complements the primary lighting of the interior of the aircraft cabin. For example, the lighting included in the bezel 220 may shine light 260 upward and onto the recessed pod well 240. The recessed pod well 240 may be contoured upward above the bezel 220 and may act as a light wash to disperse light 260 as light 270 to wash evenly on the ceiling panels and throughout the region of the aircraft cabin in which the overhead equipment stowage pod 200 is installed. The bezel 220 may include various forms of lighting, including primary cabin illumination lighting, emergency lighting, directional lighting for emergency egress, or any other lighting as may be desired in the ceiling of the aircraft cabin.

Figure 3:
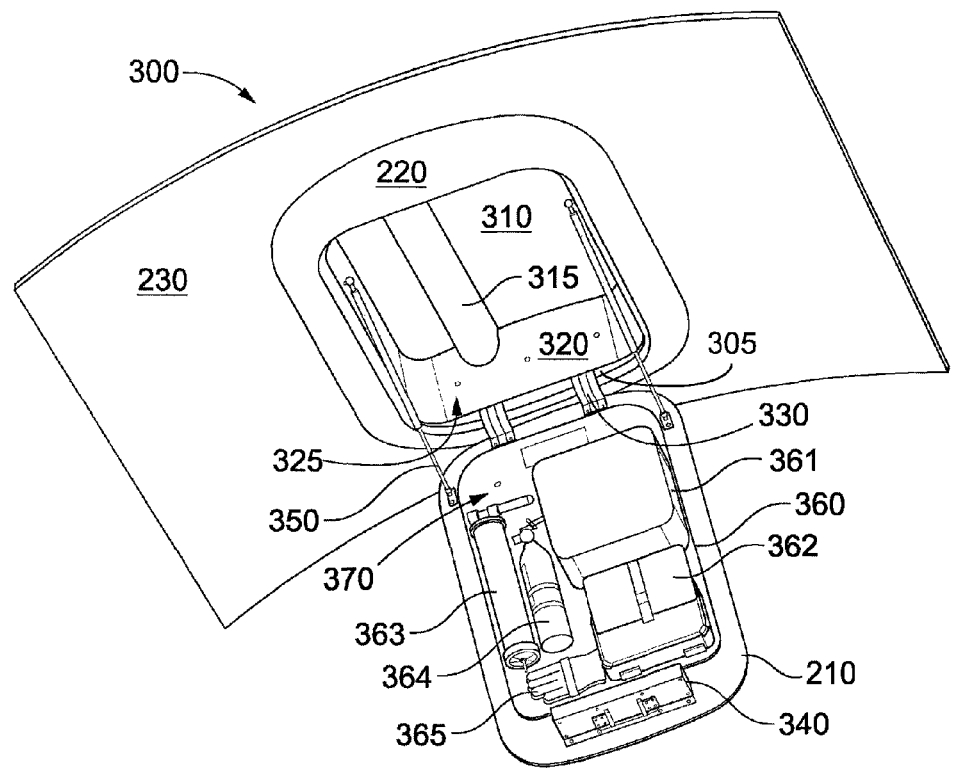
FIG. 3 is a close-up perspective view that illustrates an overhead equipment stowage pod in an open position, according to an embodiment.

FIG. 3 is a close-up perspective view that illustrates an overhead equipment stowage pod 300 in an open position, according to an embodiment. The overhead equipment stowage pod 300 may be an embodiment of the overhead equipment stowage pod 200 of FIG. 2. Operating the door handle 250 as illustrated in FIG. 2 causes a door latch 340 to unlatch and open the door 210. The door 210 may then be pulled downward to open the overhead equipment stowage pod 300, or the door 210 may open at least partially under the force of gravity. The overhead equipment stowage pod 300 may include one or more hinges 330 that attach the door 210 to a base 305 that has a lip generally parallel with the ceiling of the aircraft cabin. At least a portion of the base 305 may be hidden under the bezel 220. The one or more hinges 330 may facilitate the door 210 opening and closing while also supporting the door 210. The overhead equipment stowage pod 300 may include one or more lift assist units to assist in raising and lowering the door 210. Examples of the lift assist units are gas springs 350. While gas springs 350 are shown in FIG. 3, this should not be construed as limiting, as various other devices, for example, snubbers, mechanical springs, or other devices as known in the art, may be used instead to assist in raising and lowering the door 210. For example, the gas springs 350 may at least partially close the door 210 when the door 210 is released by a person from a fully opened position, or may slow an opening of the door 210 when the door handle 250 is operated to release the door 210 from the closed position in the overhead equipment stowage pod 300.

The overhead equipment stowage pod 300 includes a base 305 having a structural material surrounding a central opening. The structural material may include generally vertical walls 320 that are recessed into an opening in a ceiling of the aircraft cabin and an open top between the generally vertical walls 320. The generally vertical walls 320 may be coupled with the base 305 at about a level of the ceiling panel 230. The base 305 and/or generally vertical walls 320 may be fastened to a support structure of the aircraft, for example, a frame or tie rod. In an embodiment, the overhead equipment stowage pod 300 may be suspended from the airframe with six tie rods attached to the frame of the aircraft. This should not be construed as limiting, as in various embodiments the overhead equipment stowage pod 300 may be attached to a support structure of the aircraft in another manner to be suspended from a ceiling of the aircraft cabin. The overhead equipment stowage pod 300 may be fastened to the support structure via access through the open top between the generally vertical walls 320.

In addition, the overhead equipment stowage pod 300 includes a replaceable lining 310 that fits into the overhead equipment stowage pod 300 between the generally vertical walls 320. The replaceable lining 310 may also be referred to as a container, stowage bin, or bucket. The replaceable lining 310 may be formed as a single piece by a pressure forming process or vacuum forming process. The replaceable lining 310 may be separately installed in the overhead equipment stowage pod 300 after the overhead equipment stowage pod 300 is installed in the aircraft overhead lining, thereby facilitating easy access to the interior structures and components of the aircraft overhead lining during installation of the overhead equipment stowage pod 300 and for service and maintenance after the installation of the overhead equipment stowage pod 300 without requiring removal of the overhead equipment stowage pod 300. For example, lighting equipment only accessible from behind the ceiling panel may be serviced by opening the door 210, detaching the gas springs 350, removing the replaceable lining 310, performing service of the lighting by accessing the lighting through the opening in the overhead equipment stowage pod 300 made accessible by removal of the replaceable lining 310, then replacing the replaceable lining 310, reattaching the gas springs 350, and finally closing the door 210.

One or more fasteners 325 may fasten the lining 310 to the generally vertical walls 320. The one or more fasteners 325 may also fasten the lining 310, the base 305, and/or the generally vertical walls 320 to the support structure of the aircraft. The lining 310 may include one or more molded features 315 that are formed to accommodate various equipment, structures, and obstacles in the overhead lining of the aircraft cabin that may otherwise interfere with the placement of the overhead equipment stowage pod 300. For example, the molded feature 315 may be molded to go around a duct, electronic control system equipment, support equipment, wiring bundles, etc. in the overhead lining of the aircraft. The lining 310 may be replaceable and customizable to accommodate different equipment, structures, and obstacles in the overhead lining of the aircraft at different locations where it is desired to install the overhead equipment stowage pod 300. This customizability facilitates the overhead equipment stowage pod 300 being installed in virtually any ceiling location within the aircraft, including locations having obstacles to the installation of a simple rectangular box.

An equipment palette 360 may be installed on an inside surface of the door 210 for easy access by a person that opens the door 210. The equipment palette 360 may include any of a variety of different types of equipment and sundries that may be desirable to have stored in the aircraft for ready access by the crew and/or passengers of the aircraft. For example, in the illustrated embodiment of FIG. 3, the equipment palette 360 includes a defibrillator 361, a personal breathing equipment (PBE) or smoke hood 362, a water fire extinguisher 363, a halon fire extinguisher 364, and gloves 365. In various other embodiments, the equipment palette 360 may include flight safety demonstration equipment; entertainment equipment such as portable DVD players; linens; blankets; pillows; first aid kits; various types of emergency equipment; in flight service items such as cups, utensils, plates, and napkins; personal items; luggage for the crew of the aircraft; or any other items that would otherwise occupy passenger luggage bins, closets, cupboards, or other space of a conventional aircraft without the equipment stowage pod 300.

The equipment palette 360 may be fastened to the inside surface of the door 210 using one or more fasteners 370. The equipment palette 360 may be replaceable simply by unfastening the equipment palette 360 and replacing it with a replacement equipment palette 360. Therefore, equipment stored in the equipment palette 360 may be easily replaced as a group simply by removing the old equipment palette 360 and inserting a new equipment palette 360. By so doing, not only may the equipment in the equipment palette 360 be replaced, but the selection of equipment in the equipment palette 360 may be changed. For example, if the equipment palette 360 contains emergency equipment that is certified for use up until an expiration date, and at about the time of the expiration date it is desired to replace the emergency equipment with newer emergency equipment having an expiration date further into the future, the entire equipment palette 360 may be easily replaced during a routine servicing of the aircraft without needing to individually track and replace each and every item in the equipment palette 360. This can result in savings in service time of the aircraft, as well as logistics and storage of the equipment installed in the equipment palette 360.

The one or more fasteners (e.g., for the bezel 220, fasteners 325, and/or fasteners 370) may include nails, screws, rivets, bolts, magnets, pins, pegs, clips, snaps, hook and loop fasteners, adhesives, or other fasteners as known in the art. In some embodiments, the lining 310 may snap into place, the bezel 220 may snap into place, and/or the equipment palette 360 may snap into place and be held in place by friction and/or tabs that are engaged when snapping into place.

Components of the overhead equipment stowage pod 300 may be constructed of or include composite materials, plastic materials, metal materials, and/or glass materials. For example, the base 305 and walls 320 may be constructed of a composite material. The replaceable lining 310 and the bezel 220 may be constructed of a pressure or thermal formed plastic material, and the door 210 may be constructed of a composite or aluminum honeycomb panel.

The interchangeable and customizable bezel 220 and lining 310 facilitate modularity and flexibility in installation in a variety of aircraft and a variety of locations of an otherwise same overhead equipment stowage pod. This in turn facilitates a same equipment palette 360 being compatible for installation in any of the aircraft types and locations in which the overhead equipment stowage pod is installed. This facilitates savings in logistics and storage of equipment palettes 360 for aircraft fleets that encompass a variety of different types of aircraft.

Embodiments of the overhead equipment stowage pod described herein make otherwise unusable dead space above the ceiling of an aircraft panel productive as stowage space to free up other space onboard the aircraft such as overhead luggage bins, closets, drawers, galley inserts, and floor space for more productive use. In a commercial aircraft, this may result in additional revenue-generating opportunities.

Figure 4:
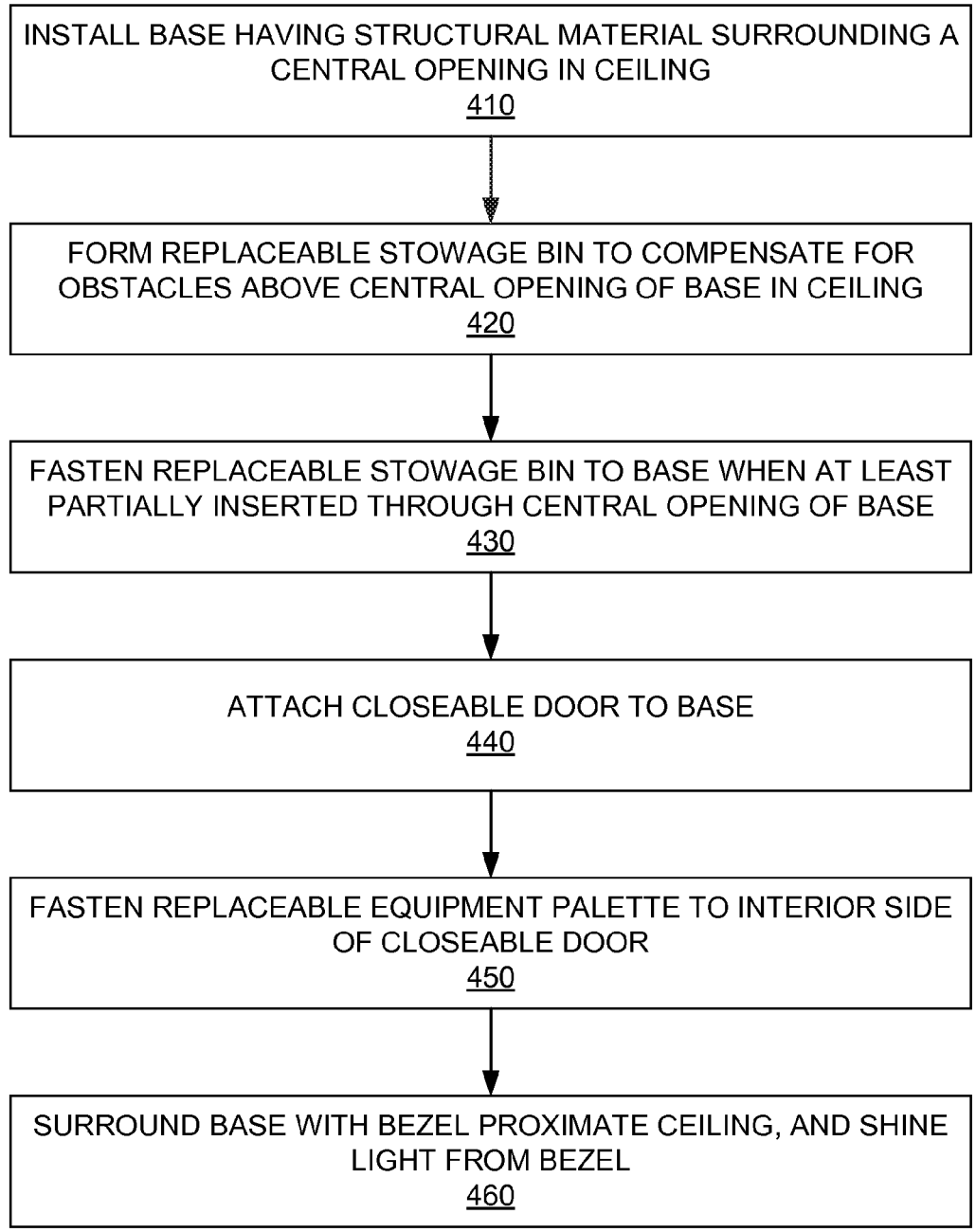
FIG. 4 is a flow chart that illustrates a method of installing an overhead equipment stowage pod, according to an embodiment.

FIG. 4 is a flow chart that illustrates a method of installing an overhead equipment stowage pod, according to an embodiment. The overhead equipment stowage pod discussed with reference to FIG. 4 may be an embodiment of the overhead equipment stowage pod 150, 200, or 300 of FIG. 1, 2, or 3. In a step 410, a base having structural material surrounding a central opening is installed in a ceiling by fastening the base to a support structure above a level of a ceiling panel. The central opening is open on both top and bottom. In a step 420, a replaceable stowage bin is formed to compensate for obstacles above the central opening of the base and above the level of the ceiling panel. In a step 430, the replaceable stowage bin is fastened to the base when at least partially inserted through the central opening of the base into the ceiling. The replaceable stowage bin may be fully inserted through the central opening of the base, in an embodiment. In a step 440, a closeable door is attached to the base. The closeable door may be suspended below the base and the replaceable stowage bin. The closeable door may be attached to the base with one or more hinges, one or more lift assist units, or both. In a step 450, a replaceable equipment palette is fastened to an interior side of the closeable door to be accessible when the closeable door is opened. In a step 460, the base is surrounded with a bezel proximate the ceiling, and light is shined from the bezel. In an embodiment, the light shines onto the ceiling surrounding the bezel from within a gap between the ceiling and the bezel. In another embodiment, the light shines onto a recessed pod well surrounding the bezel from within a gap between the recessed pod well and the bezel. In this embodiment, the recessed pod well is contoured upward above the bezel and disperses the light.

Figure 5:
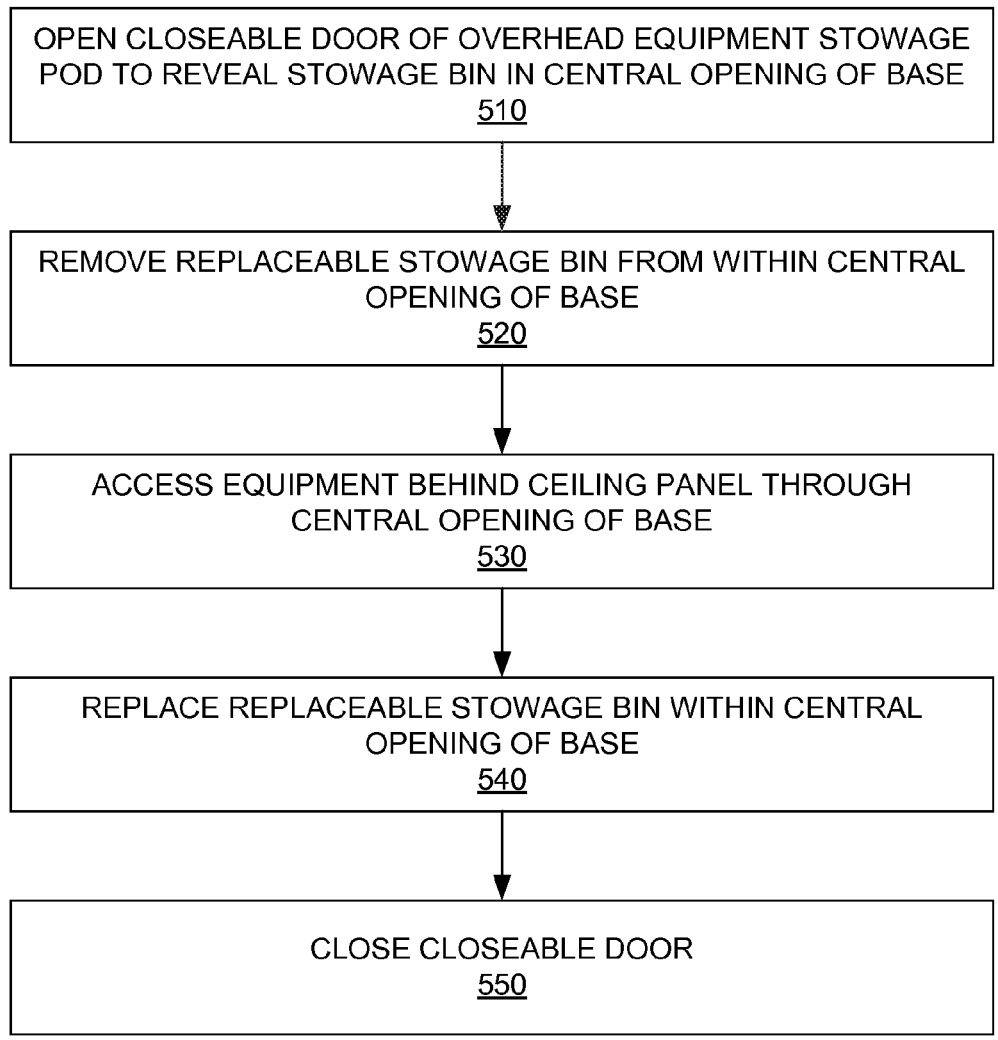
FIG. 5 is a flow chart that illustrates a method of accessing equipment behind a ceiling panel through an overhead equipment stowage pod, according to an embodiment.

FIG. 5 is a flow chart that illustrates a method of accessing equipment behind a ceiling panel through an overhead equipment stowage pod, according to an embodiment. The overhead equipment stowage pod discussed with reference to FIG. 5 may be an embodiment of the overhead equipment stowage pod 150, 200, or 300 of FIG. 1, 2, or 3. In a step 510, a closeable door of an overhead equipment stowage pod is opened to reveal a stowage bin in a central opening of a base of the stowage pod. In a step 520, the replaceable stowage bin is removed from within the central opening of the base. In a step 530, equipment behind the ceiling panel is accessed through the central opening of the base. In a step 540, the replaceable stowage bin is replaced within the central opening of the base. In a step 550, the closeable door is closed, covering the central opening of the base.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An overhead equipment stowage pod apparatus comprising:
   a base having a structural material surrounding a central opening, the central opening being open on top and bottom, the base fastened to a support structure proximate a ceiling;
   a replaceable stowage bin at least partially inserted through the base into the ceiling;

a ceiling panel that includes a cutout into which the base is inserted, and a recessed pod well surrounding the base and extending below a level of the ceiling panel, the recessed pod well being contoured upward; and a closeable door suspended below the stowage bin.

2. The apparatus of claim 1, further comprising a bezel that surrounds the base proximate the ceiling, the bezel including a lighting element that shines light.

3. The apparatus of claim 1, further comprising a bezel that surrounds the base below the level of the ceiling, leaving a gap between the ceiling and the bezel, the bezel including a lighting element that shines light onto the ceiling surrounding the bezel from within the gap between the ceiling and the bezel.

4. The apparatus of claim further 1, comprising a bezel that surrounds the base below a level of the recessed pod well, leaving a gap between the recessed pod well and the bezel, the bezel including a lighting element that shines light onto the recessed pod well surrounding the bezel from within the gap between the recessed pod well and the bezel, the recessed pod well being configured as a light wash to disperse the light shined by the lighting element.

5. The apparatus of claim 1, further comprising a lift assist unit attached to the base and the closeable door that assists in raising and lowering the closeable door.

6. The apparatus of claim 1, wherein the replaceable stowage bin includes a molded feature formed to accommodate an obstacle in the ceiling.

7. The apparatus of claim 1, further comprising a plurality of tie rods that attach the base to the support structure.

8. The apparatus of claim 1, further comprising a replaceable equipment palette fastened to an interior side of the closeable door.

9. The apparatus of claim 8, wherein the replaceable equipment palette includes at least one of emergency equipment and entertainment equipment.

10. An overhead equipment stowage pod apparatus comprising:
    a base having generally vertical walls and an open top fastened to a support structure proximate a ceiling;
    a ceiling panel that includes a cutout into which the base is inserted, and a recessed pod well surrounding the base and extending below a level of the ceiling panel;
    a bezel that surrounds the base below a level of the recessed pod well, leaving a gap between the recessed pod well and the base, the bezel including a lighting element that shines light onto the recessed pod well surrounding the bezel from within the gap between the recessed pod well and the base, the recessed pod well being contoured upward above the bezel and configured as a light wash to disperse the light shined by the lighting element;
    a replaceable stowage bin at least partially inserted through a central opening in the base into the ceiling;
    a closeable door suspended below the stowage bin; and
    a replaceable equipment palette fastened to an interior side of the closeable door.

11. The apparatus of claim 10, further comprising a lift assist unit attached to the base and the closeable door that assists in raising and lowering the closeable door.

12. The apparatus of claim 10, wherein the replaceable stowage bin includes a molded feature formed to accommodate an obstacle in the ceiling.

13. The apparatus of claim 10, further comprising a plurality of tie rods that attach the base to the support structure.

14. A method of installing an overhead equipment stowage pod, the method comprising:
    installing a base having structural material surrounding a central opening, the central opening being open on top and bottom, in a ceiling by fastening the base to a support structure above a level of a ceiling panel, the ceiling panel including a recessed pod well extending below the level of the ceiling panel and being contoured upward;
    forming a replaceable stowage bin to compensate for obstacles above the central opening of the base and above the level of the ceiling panel;
    fastening the replaceable stowage bin to the base when at least partially inserted through the central opening of the base into the ceiling; and
    attaching a closeable door to the base.

15. The method of claim 14, further comprising fastening a replaceable equipment palette to an interior side of the closeable door to be accessible when the closeable door is opened.

16. The method of claim 14, further comprising:
    opening the closeable door to reveal the stowage bin in the central opening of the base;
    removing the replaceable stowage bin from within the central opening of the base;
    accessing equipment behind the ceiling panel through the central opening of the base;
    replacing the replaceable stowage bin within the central opening of the base; and
    closing the closeable door.

17. The method of claim 15, further comprising:
    surrounding the base with a bezel proximate the ceiling; and
    shining light from the bezel.

18. The method of claim 17, wherein the light shines onto the ceiling surrounding the bezel from within a gap between the ceiling and the bezel.

19. The method of claim 17, wherein the light shines onto the recessed pod well surrounding the bezel from within a gap between the recessed pod well and the bezel, the recessed pod well dispersing the light.

* * * * *